United States Patent
Casey

(10) Patent No.: US 8,613,037 B2
(45) Date of Patent: Dec. 17, 2013

(54) WIRELESS DIGITAL VIDEO RECORDER MANAGER

(75) Inventor: Steven M. Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 2023 days.

(21) Appl. No.: 11/060,219

(22) Filed: Feb. 16, 2005

(65) Prior Publication Data

US 2006/0184983 A1    Aug. 17, 2006

(51) Int. Cl.
*H04N 7/16* (2011.01)
*H04N 7/173* (2011.01)

(52) U.S. Cl.
USPC ............ 725/142; 725/62; 725/87; 725/100; 725/131; 725/133; 725/134; 725/139; 725/141; 725/145; 725/147; 725/151; 725/153

(58) Field of Classification Search
USPC ............ 725/38, 62, 131, 133, 134; 455/438, 455/439
See application file for complete search history.

(56) References Cited

U.S. PATENT DOCUMENTS

| | | |
|---|---|---|
| 5,528,285 A | 6/1996 | Morikawa et al. |
| 5,557,541 A | 9/1996 | Schulhof et al. |
| 5,572,442 A | 11/1996 | Schulhof et al. |
| 5,812,790 A | 9/1998 | Randall |
| 5,864,591 A | 1/1999 | Holcombe |
| 5,887,243 A | 3/1999 | Harvey et al. |
| 5,991,596 A | 11/1999 | Cunningham et al. |
| 6,163,691 A | 12/2000 | Buettner et al. |
| 6,192,340 B1 | 2/2001 | Abecassis |
| 6,256,691 B1 | 7/2001 | Moroz et al. |
| 6,330,462 B1 * | 12/2001 | Chen .......................... 455/572 |
| 6,341,133 B1 | 1/2002 | Kawamoto et al. |
| 6,532,593 B1 | 3/2003 | Moroney |
| 6,556,217 B1 | 4/2003 | Makipaa et al. |
| 6,574,793 B1 | 6/2003 | Ngo et al. |

(Continued)

FOREIGN PATENT DOCUMENTS

EP    793164 A2    9/1997

OTHER PUBLICATIONS

*Television is coming to a cell phone near you*, http://pd.pennnet.com/Articles/Article_Display.cfm?Section=Articles&Subsection=Display&ARTICLE_ID; dated Jul. 20, 2004, 4 pages.

(Continued)

*Primary Examiner* — Nasser Goodarzi
*Assistant Examiner* — Mary A Kay
(74) *Attorney, Agent, or Firm* — Swanson & Bratschun, L.L.C.

(57) ABSTRACT

Various embodiments of the invention provide methods and systems for managing the reception and/or recording of video content on a wireless digital video recorder. In certain embodiments, the wireless digital video recorder comprises a wireless phone with video reception and video recording capabilities. One set of embodiments provides a reception manager for managing the reception of video content by the wireless digital video recorder. Merely by way of example, embodiments of the present invention may provide for monitoring of the signal strength of broadcast video content, and certain embodiments may provide for receiving and displaying information concerning video content available to the wireless digital video recorder. Other embodiments of the present invention may provide for the management of recording and/or storing video content on the wireless digital video recorder e. Merely by way of example, in some embodiments, a storage processor may determine the video content to record or may associate values to stored video content.

28 Claims, 7 Drawing Sheets

(56) References Cited

U.S. PATENT DOCUMENTS

| | | | |
|---|---|---|---|
| 6,658,268 | B1 | 12/2003 | Bodnar et al. |
| 6,741,684 | B2 | 5/2004 | Kaars |
| 6,922,567 | B1* | 7/2005 | Rydbeck ............... 455/456.3 |
| 6,931,257 | B2 | 8/2005 | Shahidi et al. |
| 6,941,154 | B1 | 9/2005 | Ritter |
| 6,947,758 | B2 | 9/2005 | Nguyen |
| 6,950,624 | B2 | 9/2005 | Kim et al. |
| 6,959,260 | B2 | 10/2005 | Rodman et al. |
| 6,981,045 | B1 | 12/2005 | Brooks |
| 7,016,643 | B1 | 3/2006 | Kuether et al. |
| 7,165,725 | B2 | 1/2007 | Casey |
| 7,209,900 | B2 | 4/2007 | Hunter et al. |
| 7,212,729 | B2* | 5/2007 | Nakajima et al. ............. 386/83 |
| 7,346,549 | B2 | 3/2008 | Deas et al. |
| 7,377,440 | B2 | 5/2008 | Casey |
| 7,654,462 | B2 | 2/2010 | Casey |
| 2001/0003195 | A1 | 6/2001 | Kajimoto |
| 2002/0032489 | A1 | 3/2002 | Tynan et al. |
| 2002/0049760 | A1 | 4/2002 | Scott et al. |
| 2002/0157101 | A1* | 10/2002 | Schrader et al. ............... 725/64 |
| 2002/0188735 | A1 | 12/2002 | Needham et al. |
| 2003/0028610 | A1 | 2/2003 | Pearson |
| 2003/0050062 | A1 | 3/2003 | Chen et al. |
| 2003/0074661 | A1 | 4/2003 | Krapf et al. |
| 2003/0081934 | A1 | 5/2003 | Kirmuss |
| 2003/0163697 | A1 | 8/2003 | Pabla et al. |
| 2004/0024688 | A1 | 2/2004 | Bi et al. |
| 2004/0030651 | A1 | 2/2004 | Kim et al. |
| 2004/0052504 | A1* | 3/2004 | Yamada et al. ................ 386/68 |
| 2004/0111756 | A1* | 6/2004 | Stuckman et al. ............ 725/142 |
| 2004/0117845 | A1 | 6/2004 | Karaoguz et al. |
| 2004/0204145 | A1 | 10/2004 | Nagatomo |
| 2004/0266336 | A1 | 12/2004 | Patsiokas et al. |
| 2005/0068417 | A1 | 3/2005 | Kreiner et al. |
| 2005/0102148 | A1* | 5/2005 | Rogitz .......................... 704/275 |
| 2005/0122435 | A1* | 6/2005 | Yunoki ......................... 348/725 |
| 2005/0144019 | A1 | 6/2005 | Murakami et al. |
| 2005/0149564 | A1* | 7/2005 | Jain et al. .................. 707/104.1 |
| 2005/0232284 | A1 | 10/2005 | Karaoguz et al. |
| 2005/0289604 | A1* | 12/2005 | Byers ............................ 725/62 |
| 2005/0289630 | A1 | 12/2005 | Andrews et al. |
| 2006/0101116 | A1 | 5/2006 | Rittman et al. |
| 2006/0184975 | A1 | 8/2006 | Casey |
| 2006/0218598 | A1 | 9/2006 | Casey et al. |
| 2007/0168429 | A1 | 7/2007 | Apfel et al. |

OTHER PUBLICATIONS

*Sony Portable TV & MPEG4 recorder*, http://www.icube.us/sony_msv-a1/product_overview.htm, dated Jul. 20, 2004, 1 page.

dynamism.com, *Sony MSV-A1—Portable TV*, http://www.dynamism.com/msv-a1/, dated Jul. 20, 2004, 1 page.

XVision Systems, Play and Convert your media files; mp3, way, asf, avi, mpg and more . . . , *About MPG, MPEG-4*, http://www.xvonline.com/xfiles/about_mpg.htm, dated Oct. 28, 2004, 2 pages.

U.S. Appl. No. 11/060,222, Notice of Allowance Dated Nov. 17, 2006, 7 pgs.

U.S. Appl. No. 11/060,222, Office Action dated Jan. 24, 2006, 9 pgs.

U.S. Appl. No. 11/060,222, Office Action dated Jun. 15, 2006, 10 pgs.

U.S. Appl. No. 11/060,222, Office Action dated Oct. 19, 2005, 7 pgs.

U.S. Appl. No. 11/060,224, Office Action dated Aug. 19, 2008, 39 pgs.

U.S. Appl. No. 11/060,224, Office Action dated Feb. 24, 2009, 45 pgs.

U.S. Appl. No. 11/060.224, Office Action dated Jul. 6, 2009, 33 pgs.

U.S. Appl. No. 11/060,633, Office Action dated Sep. 25, 2007, 8 pgs.

U.S. Appl. No. 11/060,633, Notice of Allowance dated Feb. 13, 2008, 6 pgs.

RFC 793, Transmission Control Protocol, USC Information Sciences Institute, Sep. 1981, 33 pages.

U.S. Appl. No. 11/060,224, Office Action dated Jan. 22, 2010, 41 pgs.

U.S. Appl. No. 11/060,224, Office Action dated Jul. 7, 2010, 38 pgs.

U.S. Appl. No. 11/434,729, Office Action dated Nov. 26, 2008, 16 pgs.

U.S. Appl. No. 11/434,729, Final Rejection dated Apr. 2, 2009, 22 pgs.

U.S. Appl. No. 11/434,729, Office Action dated Oct. 14, 2009, 21 pgs.

U.S. Appl. No. 11/434,729, Final Rejection dated May 11, 2010, 56 pgs.

U.S. Appl. No. 11/434,729, Office Action dated Sep. 10, 2010, 20 pgs.

U.S. Appl. No. 11/080,224, Office Action dated Nov. 3, 2010, 45 pgs.

U.S. Appl. No. 11/292,210, Office Action dated Apr. 17, 2008, 11 pgs.

U.S. Appl. No. 11/292,210, Final Office Action dated Nov. 4, 2008, 11 pgs.

U.S. Appl. No. 11/292,210, Office Action dated Apr. 15, 2009, 14 pgs.

U.S. Appl. No. 11/292,210, Notice of Allowance dated Oct. 13, 2009, 7 pgs.

U.S. Appl. No. 11/434,729, Final Rejection dated Feb. 9, 2011, 24 pgs.

U.S. Appl. No. 111060,224; Final Office Action dated Mar. 15, 2011; 40 pages.

U.S. Appl. No. 11/434,720; Final Office Action dated Feb. 14, 2012; 25 pages.

U.S. Appl. No. 11/060,224; Notice of Panel Decision dated Jul. 19, 2011; 2 pages.

U.S. Appl. No. 11/434,729, Office Action dated Jul. 14, 2011, 22 pages.

U.S. Appl. No. 11/434,729; Notice of Allowance dated Nov. 23, 2012; 27 pages.

U.S. Appl. No. 11/060,224; Notice of Allowance dated Jul. 31, 2013; 81 pages.

* cited by examiner

WIRELESS DIGITAL VIDEO RECORDER MANAGER

CROSS-REFERENCE TO RELATED APPLICATIONS

This application is related to U.S. application Ser. No. 11/060,222, filed Feb. 16, 2005 by Steven M. Casey and entitled "Mobile Device Base Station for Enhanced Signal Strength for Media Services", the disclosure of which is incorporated herein by reference for all purposes. This application is also related to U.S. application Ser. No. 11/060,224, filed Feb. 16, 2005 by Steven M. Casey and entitled "Wireless Digital Video Recorder", the disclosure of which is incorporated herein by reference for all purposes. This application is related to U.S. application Ser. No. 11/060,633, filed Feb. 16, 2005 by Steven M. Casey and entitled "Media Services Manager For Base Station", the disclosure of which is incorporated herein by reference for all purposes.

BACKGROUND OF THE INVENTION

The present invention relates generally to the field of wireless communication systems. More specifically, the present invention relates to managing the capture of video content on multifunction devices capable of wireless communication and mobile on-demand capture of video content.

Currently there are more than 169 million wireless subscribers in the United States. In previous years, industry experts have predicted that wireless phone sales were close to or had reached a saturation point. However, in recent years, a multitude of new features have been added to the basic wireless phone design to entice consumers to make new wireless phone purchases and sign up for new wireless provider plans. Therefore, wireless phones that provide features such as internet access, photographic capabilities and electronic game interfaces make up a significant and growing percentage of the overall wireless phone market. Last year about nine million camera equipped wireless phones were sold in the United States. And this year it is expected that another 28 million camera equipped wireless phones will be sold in the United States. Additionally, worldwide 60 million camera wireless phones were sold last year and more than 100 million are expected to be sold this year.

Because of the changes in wireless phone technology, consumers today expect more features from their wireless phones. These features may be for convenience, e.g., electronic address books and calendars, or leisure, e.g., electronic games and cameras. It is predicted that the next generation of wireless phones will be a combination of phones, PDAs, digital cameras, and handheld gaming devices. In fact, thanks to the digital revolution, the feature set of current wireless phones has increased to include extras such as games, music players, and text messaging. Future wireless phones might not look radically different from existing wireless phones, but their integrated abilities likely will change significantly.

As wireless phone capabilities expand, manufacturers have to look for new features to capture the attention of wireless phone consumers. In the last year the first mobile phones with integrated television tuners were introduced. These television-wireless phones integrate a television tuner and a video decoder to provide the consumer with the ability to watch free over-the-air programming.

However, the existing wireless phone television art has several deficiencies with regard to content. While a television tuner provides consumers with the means to view over-the-air programming, it has the drawback that it cannot dependably provide on demand content, i.e., certain over the air channels may not be available during the time the consumer wishes to view television or the program(s) the consumer wishes to view may not be available at that time. Further, using the wireless phone purely as a playback device limits the wireless phone users' ability to avail themselves of the mobility and availability of the wireless phone to create as-desired content for later playback.

There are many limitations to viewing television content by combining a television tuner and a wireless phone. For instance, a wireless phone is a mobile device carried by an individual to make wireless telephone calls, as such, this individual while viewing a television program on the wireless phone is likely to be interrupted by incoming calls or may need to make outgoing calls. Additionally, because a wireless phone is a mobile device it is highly likely that television viewing on such a device will occur in public or other locations where the wireless phone user may be interrupted during his or her television viewing.

BRIEF SUMMARY OF THE INVENTION

Embodiments of the present invention provide for management of a digital video recorder integrated with a wireless phone that can, in some cases, allow a subscriber to capture and store content. In certain embodiments of the present invention, the wireless phone is equipped with a tuner to receive broadcast television programming. In certain aspects the tuner may be an analog tuner. In different aspects, the tuner may be a digital tuner. In a further embodiment, the wireless phone may be capable of receiving television programs broadcast over the Internet and/or any other distribution network. In some embodiments of the present invention, the digital video recorder may record television programs onto a memory device. Merely by way of example, the memory device may be a memory card, such as a secure digital memory card ("SD"). In one alternative, the memory device may be a hard drive. Some embodiments may include a plurality and/or combination of such memory devices.

Various embodiments of the present invention also provide systems and methods for management of video content reception. In some embodiments, the present invention provides for monitoring of video content available to the wireless digital video recorder. An aspect of the present invention provides for displaying the video content available to the wireless phone user. Monitoring and/or identifying video content available to the wireless digital video recorder may involve browsing the Internet or other available networks, receiving information concerning available video content from a provider associated with the wireless digital video recorder, receiving information concerning available video content from a provider of video content, identifying available sources of video content from which to receive video content, and the like. In some embodiments a global positioning system transceiver may be used to determine the location of the wireless digital video recorder and an analysis performed regarding video content broadcast sources within range of the wireless digital video recorder.

One set of embodiments provides user interface capabilities allowing a user to manage the functionalities of the wireless digital video recorder. The user interface may include means for displaying to the user the video content available to the wireless digital phone, signal strength, storage availability, and the like. In an aspect, the user may use the interface to manage the reception, recording and or storage of video content.

Further embodiments of the present invention provide for management of the storage of video content. In some embodiments, a processor controls the storage of video content. Some embodiments provide for automatic selection of video content for recording based upon preferences of a user of the wireless digital video recorder. In some aspects, the user may enter preferences regarding video content into the wireless digital video recorder. In other aspects, the storage controller/processor may perform an analysis regarding whether or not to record available video content based upon past recording and/or viewing habits of the user. In some embodiments of the present invention, the storage controller/processor may remove previously stored video content to make room for newly available video content. In some aspects, video content is removed from the wireless digital video recorder based upon the user's preferences.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The present invention will become more fully understood from the detailed description and the accompanying drawings, wherein.

DETAILED DESCRIPTION OF THE INVENTION

Embodiments of the present invention provide devices, systems and methods for recording video content and auto-managing selectivity for capture and storage of the video content. In some cases the device may be a wireless phone. Particular embodiments, for example, provide for the incorporation of a digital video recorder into a wireless phone to provide for mobile/on-demand recording of video content. In an embodiment of the present invention, the wireless phone includes an interface for controlling the aspects of recording. In a further embodiment, the user interface is web based and supports multiple browsers in the phone or via an Internet connection to the phone.

Figure 1:
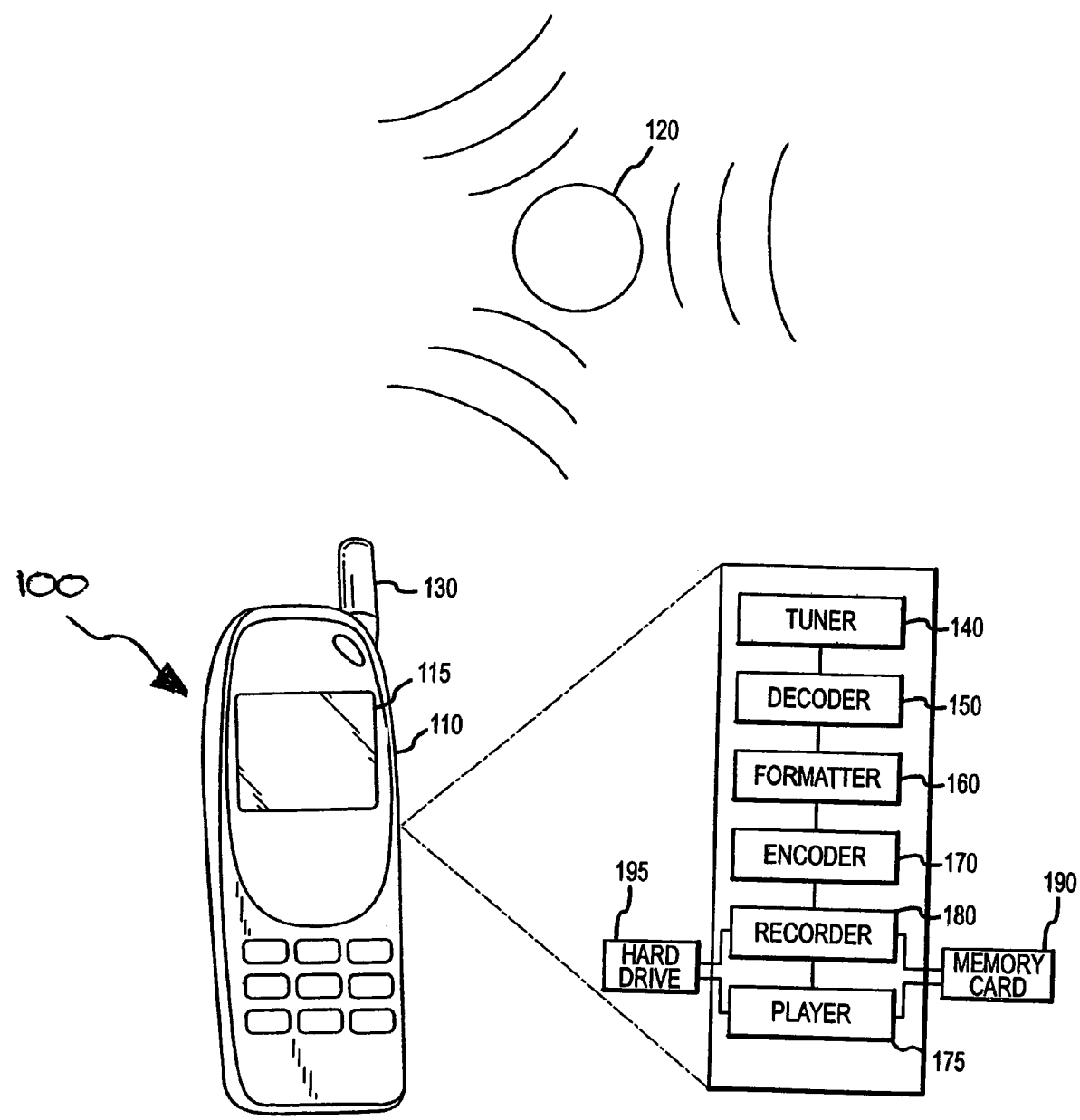
FIG. 1 is an illustration of a wireless digital video recorder and a video content source, in accordance with various embodiments of the invention.

FIG. 1 is an illustration of a wireless digital video recorder 100 for recording video content, according to some embodiments of the present invention. As depicted in FIG. 1, the wireless digital video recorder 100 comprises a wireless phone 110 that is equipped with a display 115 for, among other things, displaying video content. The video content may be broadcast by a video content provider 120 or derived from some other video content source. The video content provider 120 may be a television broadcaster, an Internet multicaster, a satellite provider, a wireless/cellular network provider, a third-party associated with such persons, or the like. The video content may be broadcast by the video content provider 120 over the air, via satellite, over a network—such as the Internet, a wireless (cell) network—or the like. Over-the-air video content may be video content which a broadcaster transmits over the air using, for example, a VHF radio transmitter.

In certain embodiments of the present invention, the wireless phone 110 may be equipped with a receiving module 130. In different aspects of the present invention, the receiving module 130 may include an antenna—such as an ultra high frequency ("UHF"), very high frequency ("VHF"), or high definition ("HD") antenna—a wireless fidelity ("WiFi") receiver, a WiMAX receiver, a satellite receiver, a receiver for receiving video content from a wireless/cellular network, a receiver for connecting to a cable television source, a modem for connecting to a computer network, a broadband connector such as an Ethernet port, or the like. In an aspect of the present invention, the receiving module may incorporate a booster antenna.

In some embodiments of the present invention, the wireless digital video recorder 100 is equipped with a receiving module 130. In different aspects of the present invention, the receiving module 130 may include an antenna—such as an ultra high frequency ("UHF"), very high frequency ("VHF"), or high definition ("HD") antenna—a wireless fidelity ("WiFi") receiver, a WiMAX receiver, a satellite receiver, a receiver for receiving video content from a wireless/cellular network, a receiver for connecting to a cable television source, a modem for connecting to a computer network, a broadband connector such as an Ethernet port, or the like. WiMAX is an implementation of the IEEE 802.16 standard, WiMAX may provide metropolitan area network connectivity at speeds of up to 75 Mb/sec. In certain aspects of the present invention, the receiving module incorporates a booster antenna.

In some embodiments of the present invention, the receiving module 130 may feed its output to the tuner 140. In certain aspect of the present invention, the tuner 140 may tune the signals available to the receiving module 130, amplify the tuned signal and/or convert it into a video signal, as appropriate. The tuner 140 may be designed for National Television Standards Committee (NTSC), PAL broadcast, SECAM, Digital Satellite System (DSS), Digital Broadcast Services (DBS), Advanced Television Standards Committee ("ATSC"), high-definition ("HD") signals, and/or a combination of these signals, and/or any other available broadcast signal. In alternative embodiments, video content may not need to be tuned. For example, the video content may be received from the Internet or from another video content source in a format that need not require tuning.

In some embodiments of the present invention, the video signal from the tuner 140 may be decoded and/or digitized by the decoder 150. The decoder 150 may be capable of analogue to digital conversion, digital to digital conversion, digital to analogue to digital conversion, or the like. In some aspects of the present invention, the decoder 150 may convert the video signal from the tuner 140 to a YCbCr 4:2:2 digital format. In certain aspects of the present invention where the video content is received in the proper format, e.g. from a computer network, such as an Internet Protocol broadcast over the Internet, or is already in digital form, digitizing by the decoder 150 may not be necessary. In certain aspects, the decoder 150 may be capable of decoding NTSC, PAL, SECAM, DSS, DBS, ATSC, or HD signals, a combination of these signals, and the like, for display on a display screen 115.

In general, decoders produce video signals with 640×480, 720×480, or 720×576 pixel formats. As such, in certain aspects of the present invention, a screen formatter 160 may be used to scale the video content decoded by the decoder 150 for display on the display screen 115 of the wireless digital video recorder 100. In some aspects of the present invention, the screen formatter 160 may scale the video content for display on the quarter common intermediate format ("QCIF"), which is 176 by 144 pixels. In other aspects, the screen formatter 160 may scale the video content for display on the quarter video graphics array ("QVGA"), which is 320 by 240 pixels. Alternative aspects of the present invention may provide for scaling of different high definition formats as they evolve. In other embodiments of the present invention, screen formatting may not be performed prior to recording of the video content. However, video content that is not formatted prior to recording requires greater storage requirements. Alternatively or additionally, formatting of video content played on the wireless digital video recorder may occur during playback of video content.

In some embodiments, after formatting, the video content may be suitable for display on the display screen 115 of the wireless digital video recorder 100. In various embodiments of the present invention, the video content may be recorded by a digital video recorder 180. In certain embodiments of the present invention, an encoder 170 may compress the video content prior to recording by a digital video recorder 180. In an aspect of the present invention, compression may be achieved by bitrate encoding of the video signal received by the encoder 170.

As persons familiar with the art are aware, bitrate encoding is the process wherein each frame of the video content is encoded to a certain number of bits or bytes. In some embodiments of the present invention, bitrate encoding may be fixed bitrate encoding. In alternative embodiments the bitrate encoding may be variable bitrate encoding. In certain embodiments of the present invention, the encoder 170 may encode the video signal in one or more of the Moving Picture Experts Group ("MPEG") formats, such as MPEG2, MPEG4, etc. In alternative embodiments of the present invention, other bitrate encoding formats may be used—such as Sorenson, Windows Media 9, Windows Media 10, or other proprietary formats—or the like. As persons familiar with the art are aware, compression of the video content reduces the storage space necessary to store the video content.

In some embodiments of the present invention, the digital video recorder 180 may record the compressed video content to a memory card 190. In some aspects, the memory card may be a secure digital ("SD") card. In alternative aspects, the memory card may be a media card, flash card, memory stick, or the like. In other embodiment of the present invention, the digital video recorder 180 may record the video content to a hard drive 195.

In various embodiments of the present invention, the use of the memory card 190 may solve the storage issues regarding the storage capabilities of a mobile digital recording device, since an auto-management system, as described below, may allow a user of the wireless digital video recorder to use multiple memory cards for storage purposes. In some embodiments of the present invention, an auto-management system may provide for an alert to occur when the available storage on the memory card 190 reaches a threshold value. Merely by way of example, the alert may be an audible alert from a speaker on the wireless digital video recorder 100 and/or it may be a visual alert on the display screen 115 of the wireless digital video recorder 100. In aspects of the present invention, one or more additional memory cards 190 may be stored on the wireless digital video recorder 100, providing a user of the wireless digital video recorder 100 with means to expand, on demand, the storage available to the digital video recorder 180. In certain embodiments of the present invention, a buffer may be used to provide for recording of the video content to the buffer while the memory card 190 is being changed for a new memory card and/or to compensate for relatively slow writing to the memory card 190. In some embodiments of the present invention, Digital Rights Management ("DRM") technology may be installed on the wireless digital video recorder 100. In some aspects, the DRM may provide for compliance with the requirements of the video content provider to provide for the copying of protected video content. In certain aspects the DRM may provide for recording and/or distribution of video content to other devices.

In various embodiments of the present invention, the wireless digital video recorder 100 may incorporate a video player 175. In certain aspects the video player 175 may be capable of receiving the memory card 190 and playing the stored video content onto the display screen 170. In other aspects, the video player 175 retrieves the video content stored on the hard drive 195 and plays it on the display screen 115. In aspects of the present invention, the video player 175 may decompress or reformat the video content as necessary for best display on the display screen 115. As persons with skill in the art are aware, the components making up the video player 175 may be wholly or partially incorporated into the video recorder 180. In certain aspects, a DRM system may be installed on the wireless digital video recorder 100 in compliance with the requirements of the video content provider to provide for the recording of protected video content on the wireless digital video recorder 100 and/or the transferring of protected video content to and/or from the wireless digital video recorder 100.

In a variety of embodiment of the present invention, the user may view the display screen 115 and view video content as it is being received and recorded. In certain aspects of the present invention, the user may pause the video content and then begin seamlessly viewing the video content from the pause point via the video player 175. In further aspects, the user, while viewing the video content being received by the wireless digital video recorder 100, may rewind the video content recorded by the digital video recorder 180. Other manipulations, such as commercial skipping etc, may be provided as well.

Figure 2A:
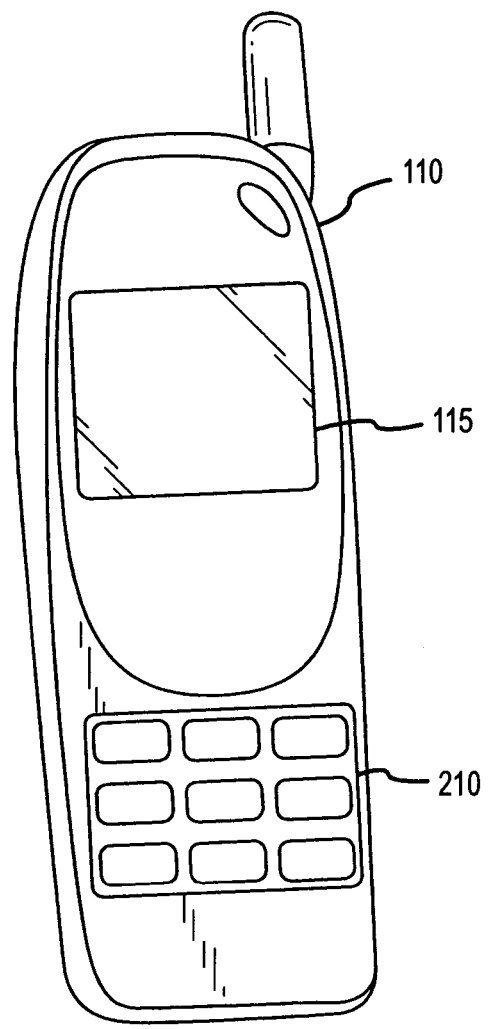
FIG. 2A is an illustration of a wireless digital video recorder, in accordance with various embodiments of the invention.

FIG. 2A illustrates a wireless digital video recorder, according to certain embodiments of the present invention. In the illustrated embodiments, the wireless digital video recorder 100 comprises the wireless phone 110, the display screen 115 and control buttons 210. The control buttons 210 may be used by the user to manually select video content available to the wireless digital video recorder 100 from content providers and/or to initiate recording of the selected video content. The user may determine the availability of video content by clicking through and visually registering the available video content. Control buttons 210 may also be used to select playback of stored video content. In some embodiments of the present invention, the control buttons 210 may be a keyboard or the like. Merely by way of example, the control buttons 210 may be a computer style keyboard. In certain aspects, the control buttons 210 may be an abbreviated or miniaturized keyboard. In an alternative embodiment, the wireless digital video recorder 100 may have a touch screen that the user may use to interface with the wireless digital video recorder 100 and manage the functionalities of the wireless digital video recorder 100.

Figure 2B:
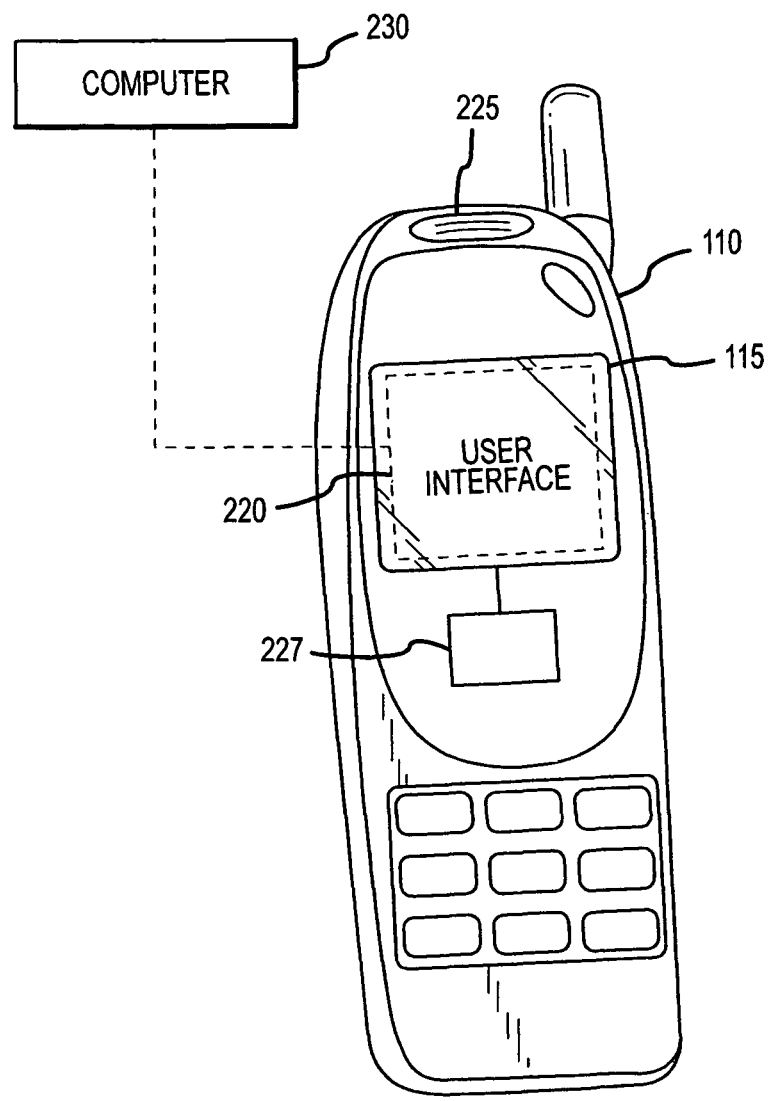
FIG. 2B is an illustration of a wireless digital video recorder with user interface features, in accordance with various embodiments of the invention.

FIG. 2B is an illustration of a wireless digital video recorder with user interface features, in accordance with various embodiments of the invention. In some embodiments of the present invention, the user interface 220 may be displayed on the display screen 170 and/or may be web based. In certain aspects, the user interface 220 may support one or more browsers, e.g. web browsers, in the wireless digital video recorder 100. Using the browser(s), the user of the wireless digital video recorder 100 may access information on the world-wide-web to identify availability of video content available to the wireless digital video recorder 100. In aspects of the present invention, the user interface 220 may display battery charge, signal strength for video content available to the wireless digital video recorder 100, signal storage space available on the memory card 190 and/or the hard drive 195, and the like. Alerts may also be displayed on the user interface 220. Alerts may include a visual alert when recording has started or stopped, an alert when new video content is available for viewing on the wireless digital video recorder 100, a signal strength alert, or the like. Alerts may also be produced audibly from the speaker 225. Audible alerts may be produced for the same reasons as the visual alerts previously described and in some aspects both visual and audible alerts may be given together.

In various embodiments of the present invention, the user may interact with the user interface 220 to enter a wish list of preferred video content. The wish list may order and/or prioritize the type of video content that the user desires to have recorded by the digital video recorder 180. The user may enter, for example, the name of a regularly-broadcast show or a type of sport into the wish list. The user may also enter rules into the user interface 220. The rules may include, merely by way of example, the user's preferences for video content, the user's preferences for video content providers, the user's preferences for video content format—e.g., digital, analog, over-air, etc—the user's threshold requirements for signal strength, and/or the like. In certain embodiments, the user interface 220 may display video content available to the wireless digital video recorder 100 and display titles, descriptions, video content sources, available signal strengths, and the like. In certain aspects, the available video content may be filtered by filters set up by the user to limit the range of available video content displayed to a manageable set. Alternatively, the available video content may be ordered according to the rules described above. Further embodiments may provide for video content available to the wireless digital video recorder 100 to be arranged alphabetically or according to any other logical process and displayed on the user interface 220. Some embodiments may include a search, allowing the user to search for and/or identify video content available to the wireless digital video recorder 100. In certain aspects, the user may search the wireless digital video recorder 100 for available video content by entering a search term into the user interface 220.

The user interface 220 may also display the video content stored on the wireless digital video recorder 100 and/or stored on the memory card that is provided in the read/write slot of the wireless digital video recorder 100. The user interface 220 may be a touch screen interface. In certain aspects, the control buttons 210 may be used to control the user interface 220. Alternatively, the user may use other controls on the wireless digital video recorder 100, such as keypad buttons, etc., to interact with the user interface 220. In further embodiments, a keyboard or a similar device may be interfaced with the wireless digital video recorder 100 to provide the user with means to interact with the user interface 220. The keyboard may be capable of being broken down for travel purposes and may interface with the wireless digital video recorder 100 via a wire connection, a wireless connection, a Bluetooth connection, or the like. In certain embodiments, the user interface 220 may contain a pointer control that the user of the wireless digital video recorder 100 may activate to set one or more pointer locations on the video content recorded on the wireless digital video recorder 100. In certain aspects, the user of the wireless digital video recorder 100 may activate a pointer on the recorded video content prior to stopping watching video content and then use the set pointer to continue watching the recorded video content from the set point during another viewing session. In some aspects, the user of the wireless digital video recorder 100 may activate a pointer via the user interface 220 to identify video content of interest that may be recalled from the wireless digital video recorder 100 at a subsequent time by returning to the pointer location. Multiple pointers may be activated on a single piece of video content and may provide a user the ability to move through the video content to identified areas of interest.

Embodiments of the present invention provide for methods and systems for determining what video content is available to the wireless digital video recorder 100. Being a mobile device, the video content available to the wireless digital video recorder 100 may change. In some embodiments of the present invention, with regard to Internet-based video broadcasts, the user and/or the wireless digital video recorder 100 may use a browser and/or an Internet interface—WiFi, modem, Ethernet, DSL, etc., to ascertain available video content. In other embodiments of the present invention, with regard to satellite or other broadcasts, programming schedules may be ascertained from the broadcast provider and/or from the Internet and displayed on the wireless digital video recorder 100 using an electronic program guide ("EPG") or similar feature. Broadcast times for satellite video content may be updated repeatedly when communication with the satellite provider or Internet is available.

In further embodiments, because of the varying availability of over-the-air broadcasts due to the location of the wireless digital video recorder 100, a global positioning system ("GPS") transceiver 227 may be incorporated into the wireless digital video recorder 100. In certain aspects, the GPS transceiver 227 may provide positioning information for the wireless digital video recorder 100 and a processor in the wireless digital video recorder 100 may use this information to determine the availability of video content providers and/or video content. In other embodiments, a wireless provider may transmit, constantly, periodically or on demand, information regarding video content available to the wireless digital video recorder 100. In some embodiments, a wireless provider may maintain a website that a user of the wireless digital video recorder 100 may access to view or download available video content. The wireless provider may arrange the video content availability according to regions of the wireless provider's network where the content may be received by a wireless digital video recorder 100. Information about available video content available on the Internet may be arranged according to the methods disclosed above.

In certain aspects, the user interface 220 may be accessed by a user from a computer 230. The computer may access wireless digital video recorder 100 either via a hard connection—such as a docking station, USB connection, or the like—or via an Internet or wireless connection. Any suitable computer may be used, and a computer may use proprietary and/or standardized software to interface with the wireless digital video recorder 100. Merely by way of example, when the wireless digital video recorder 100 is connected to the user interface 220 via the computer 230, the user may use a dedicated client application and/or a web-browser in the computer 230 to identify video content to record and send the applicable instructions to the wireless digital video recorder 100 instructing wireless digital video recorder 100 to start recording the identified video content at a defined time on a defined channel. The browser may search, for example, content listings on the Internet from a provider, etc. In an embodiment of the present invention, the communication between the wireless digital video recorder 100 and computer 230 is bi-directional to provide the user with information concerning the wireless digital video recorder 100. Information provided to the computer 230 may include battery charge, signal strength for available video channels, storage space available, and/or the like. In a further aspect of the present invention, the user may use the computer 230 to download instructions and/or rules to the wireless digital video recorder 100 and/or to otherwise configure and/or operate the wireless digital video recorder 100. Software running on the user's computer 230 may provide some or all the options available regarding the possible settings for the wireless digital video recorder 100. The user, for example, may select desired settings on the computer 230 and download the selected settings to the wireless digital video recorder 100.

Figure 3:
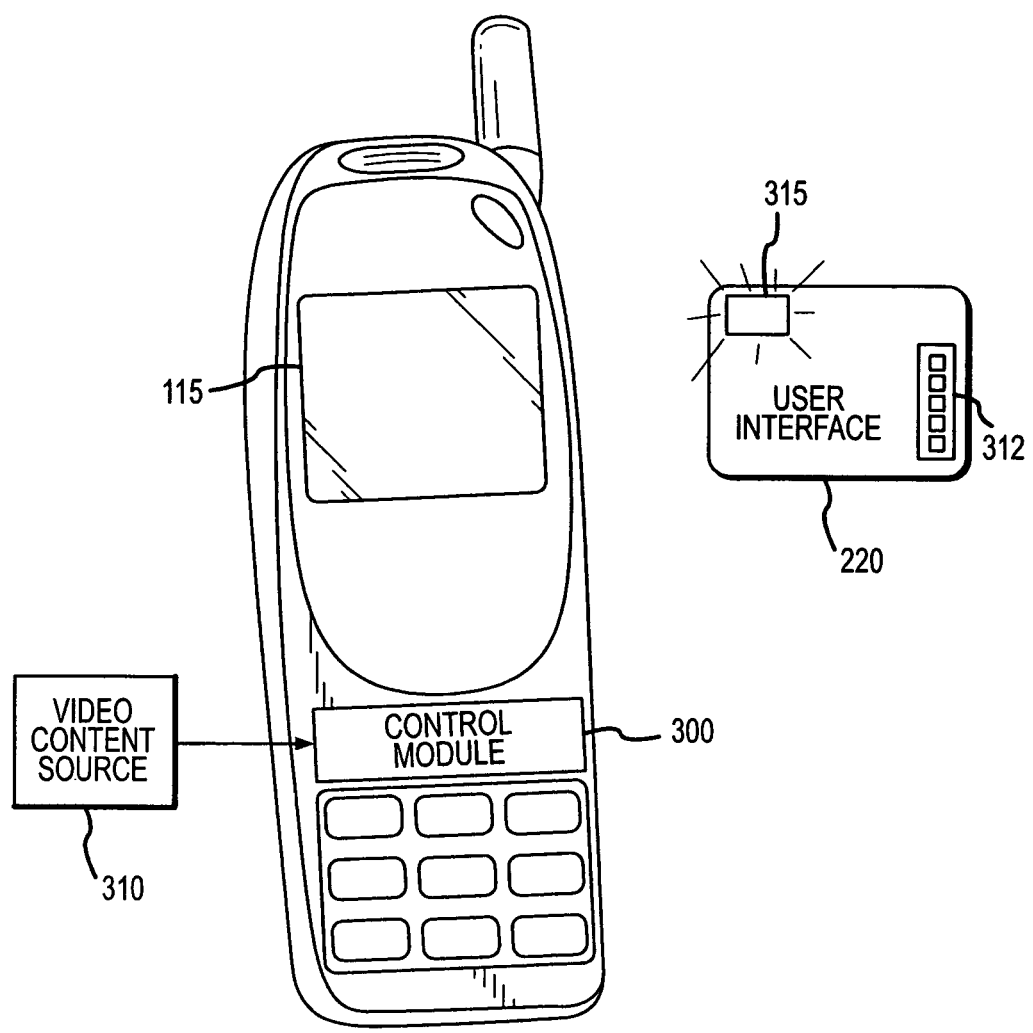
FIG. 3 illustrates a wireless digital video recorder with a control module, in accordance with various embodiments of the invention.

FIG. 3 illustrates a wireless digital video recorder with a control module, in accordance with various embodiments of the invention. In various embodiments of the present invention, the control module 300 may monitor the signal strength of a selected video content source 310. In aspects of the present invention, the control module 300 may cause a signal strength indicator 312 to be displayed on the display screen 115 indicating the strength of the video content signal being received by the wireless digital video recorder 100. The control module 300 may also cause an alert such as a flashing signal 315 to be displayed on the display screen 115 when the digital video recorder 180 is active and the strength of the signal from the video content source 310 drops below a threshold value. In certain aspects of the present invention, the threshold value may be set by the wireless phone manufacturer. In alternative aspects, the threshold may be set by a processor that monitors and tests the video signal. In a further aspect, the user may set the threshold based upon, among other things, the video quality desired. The control module 300 may cause the emission of audible alerts, transmitted from the speaker 225 of the wireless digital video recorder 100 or through a headphone port, etc., to indicate to the user that the signal for video content that is being recorded by digital video recorder 180 has dropped below the threshold value.

In some embodiment of the present invention, control module 300 may contain processing capabilities allowing it to make intelligent determinations. In an aspect of the present invention, the control module 300 may select the best receiving option to receive the video content from the video content source 310 selected by the user. In situations where one or more video content sources 310 are broadcasting video content in different forms, the control module 230 may select the best available receiving mode. Selection of receiving mode by the control module may be made based upon many factors, such as available signal strength, signal characteristics—e.g., digital compared to analog—or the like. In an embodiment of the present invention, the control module 300 may be capable of communicating with the web to access information regarding video content source 310 so that it may make a determination regarding the superiority of available reception means. In other embodiments, the control module 300 may receive information transmitted by the video content source 310 or by a wireless network advisor regarding the properties of the video content source 310. In some aspects, the control module 300 may make independent decisions or display options on the display screen 115 allowing the user to make the final determination.

In some embodiments of the present invention, the control module 300 may be capable of communicating with the GPS 227 associated with the wireless digital video recorder 100. In such embodiments, the control module 300 may use the position of the wireless digital video recorder 100 relative to the video content source 310 providing video content in order to make a determination from which video content source 310 to receive the video content. The control module 300 may use any suitable communication technology (such as WiFi, Bluetooth, etc) to access information regarding available video content and/or the status or other information concerning the video content source 310.

Figure 4A:
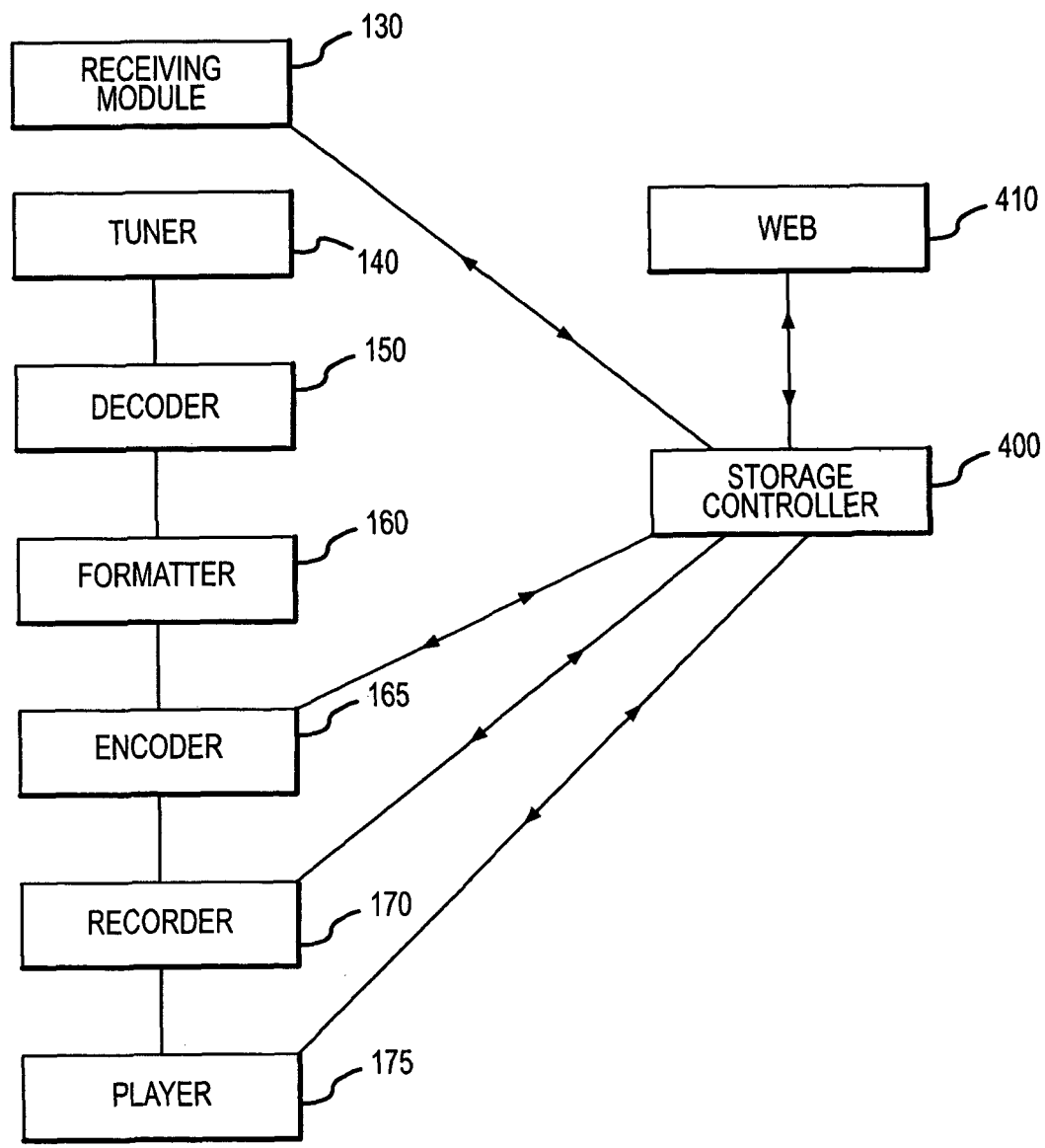
FIG. 4A is a block diagram of a wireless digital video recorder with a storage controller, in accordance with various embodiments of the invention.

FIG. 4A is a block diagram of a wireless digital video recorder with a storage controller, in accordance with various embodiments of the invention. In some embodiments, the storage controller 400 may be a processor on the wireless digital video recorder 100 for controlling storage of content on the wireless digital video recorder 100. In other embodiments, the storage controller 400 may be a software application that may be run on processor associated with the wireless digital video recorder 100. In certain aspects, the storage controller 400 may be a software application that may be run on the processor controlling the wireless phone 110. In still further embodiments, the storage controller 400 may be a processor or application associated with a base station, such as is described in related applications listed above, with which the wireless digital video recorder 100 is capable of communicating. In certain embodiments of the present invention, the storage controller 400 is capable of communicating with, at the least, the receiving module 130, the encoder 165, the digital video recorder 180, the video player 185 and the web 410. Additionally, in some embodiments, the storage controller 400 may be accessed by a user via the user interface 220 or from a personal computer 230 (e.g., via the Internet, a wireless connection, or the like), a dedicated connection, etc.

In aspects of the present invention, the storage controller 400 may receive rules from a user regarding the receiving and/or recording of video content. Rules may include prioritization of types of video content to receive and/or record, lists of programs to receive and/or record over a selected period of time, one or more sources from which to receive video content—e.g., off-air, Internet, or the like—the identity of regularly scheduled programs to record periodically, and the like. In certain aspects of the present invention, the rules may be flexible and/or the video storage controller 400 may add to and or alter the rules based upon actions taken by the user, such as the video content previously viewed, previous recording preferences, and the like. For example, the video storage controller 400 may "learn" the user's habits, etc. By communicating with the world-wide-web 410, the video storage controller 400 may be able, in some embodiments, to automatically identify available video content and/or to select video content for recording by the digital recorder 180 according to the rules.

In some embodiments of the present invention, the storage controller 400 may control the reception of video content by the wireless digital video recorder 100. Based upon the rules and/or the habits of a user, the storage controller may select video content available to the wireless digital video recorder 100 for reception by the receiving module 130. In such aspects, the storage controller 400 may control the receiving module 130 to receive video content selected by the storage controller. In some aspects, where tuning is necessary the storage controller 400 may control the tuner 140 to tune the selected video content. In certain embodiments, the storage controller may select video content for reception by the wireless digital video recorder 100 and may control the video recorder 180 to record the selected and received video content.

In some embodiments of the present invention, the storage controller 400 may control the storage of video content. In an aspect, the storage controller 400 may select video content to delete from the memory card 190 or the hard drive 195 to make room for new video content. The storage controller 400 may prioritize video content stored on the wireless digital video recorder 100. Prioritization and determinations regarding video content storage may be made according to the rules and/or a user's previous recording habits. The storage controller may also associate an expiration date with video content stored on the wireless digital video recorder 100. The expiration date may be uniform and/or may vary with video content type. Once an expiration date associated with the video content is met or exceeded, the storage controller 400 may provide for the erasing of the video content from the wireless digital video recorder 100.

Figure 4B:
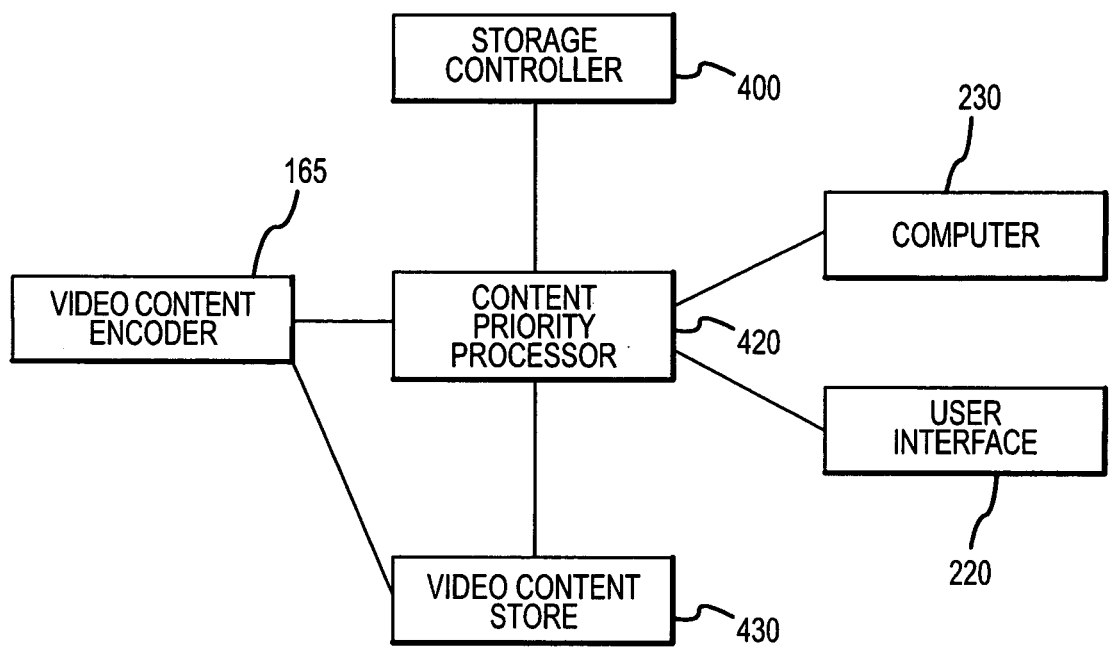
FIG. 4B is a block diagram of a user interface and storage controller, in accordance with various embodiments of the invention.

FIG. 4B is a block diagram of a user interface and storage controller, in accordance with various embodiments of the invention. In certain embodiments of the present invention, the storage controller 400 may contain a content priority processor 420. In one aspect, the content priority processor 420 may determine a priority of video content recorded on the wireless digital video recorder 100. The content priority processor 420 may select video content for recording by the digital video recorder 180 according to the rules, outlined above. The content priority processor 420 may also communicate with a video content store 430 to ascertain the amount of free storage available. The video content store 430 may be a memory card, a hard drive, and/or the like. In an embodiment of the present invention, the content priority processor 420 may provide details concerning the content store 430 to the user, e.g., via the display screen 115, user interface 220, a computer interfacing with the wireless digital video recorder 100 via the Internet, wireless connection, etc. Details provided by the content priority processor 420 and displayed on the wireless digital video recorder 100 or an associated display may include available space, video content stored, and the like.

In some aspects of the present invention, the content priority processor 420 may cause an alert to be provided to the user when the available space on the content store 430 reaches a threshold. When the content store is a memory card, the content priority processor 420 may provide an alert when the memory card has less than a defined amount of storage available. The content priority processor 420 may also cause an alert to be produced, as described above, when the amount of video content selected by the user for recording exceeds the storage capacity of the content store 430 whether the content store is a hard drive, a memory card, or the like.

In various embodiments of the present invention, content priority processor 420 may select content stored in the content store 430 to be overwritten. The user may select the stored video content to be overwritten and/or the content priority processor 420 may make the determination based upon preferences entered by the user, the user's preferences as revealed in previous recordings or viewings of video content performed by the user with the wireless digital video recorder 100, or the like. In some embodiments, the content priority processor 420 may decide to delete content stored in the content store 430 after it has been stored for longer than a threshold period. The content priority processor 420 may automatically delete content from the content store 430 after a period exceeding the threshold limit or the content priority processor 420 may cause an alert to be given to the user so that the user may make the determination regarding what to do with the stored video content.

After prioritization, the content priority processor 420 may communicate with a content encoder 165 that may format the video content for storage in the content store 430. In an aspect of the present invention, the encoder 165 may compress the video content for optimum storage. The encoder 165 may compress the video content by formatting the video content into MPEG-4 format or other compression formats. In another aspect, the encoder 165 may provide for other types of bitrate encoding of the video content. Bitrate encoding may be either constant or variable bitrate encoding.

Figure 5:
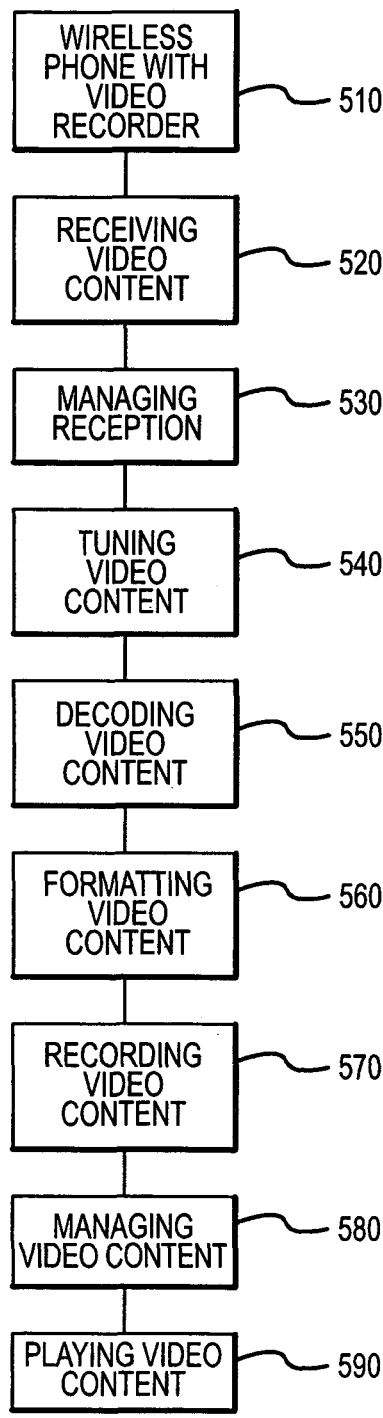
FIG. 5 is a flow diagram of a method for receiving and recording content on a wireless phone with a digital recorder, in accordance with various embodiments of the invention.

FIG. 5 is a flow diagram of a method for receiving and recording content on a wireless phone with a digital recorder, in accordance with various embodiments of the invention. As described in more detail above and illustrated in step 510, a wireless phone 110 is provided with an associated video recorder 170. Receiving of video content may occur in step 520. In some embodiments of the present invention, the wireless phone 110 may be equipped with an antenna, a satellite receiver, a network input such as a WiFi receiver, and/or other types of receiving/input devices for receiving broadcast video content.

In step 530 managing of the reception of video content may occur. In some embodiments, management of reception of video content may be actuated by a processor associated with the wireless phone 110, a software application run on the wireless phone's processor, and/or the like. As discussed in more detail above, managing reception of video content may involve identifying video content available to the wireless phone 110—for example by accessing the web, accessing an available content listing provided by a wireless phone provider, ascertaining the location of the wireless phone relative to over-the-air video content broadcasters, etc.—determining what video content to receive, identifying sources of video content, monitoring reception strength, providing alerts to the user regarding the reception of video content, etc.

In step 540 video content available to the wireless phone 110 may be tuned. As discussed above the properties of the tuner 140 may vary depending upon the source of the video content. In some embodiments, tuning of the video content may involve tuning to a frequency, wavelength, satellite source, etc., of a broadcast video signal. In other embodiments, merely by way of example, tuning may involve downloading of streaming video from a network source. In step 550 video content received by and/or input to the wireless phone 110 may be decoded. In some embodiments, a decoder 150 configured to decode video content received by the wireless phone 110 may be used for decoding and/or digitizing video content received by the wireless phone 110. In further embodiments, video content received by the wireless phone 100 may not require decoding and/or digitizing.

In step 560 video content received by and/or input to the wireless phone 110 may be formatted. In some embodiments of the present invention, the formatting may involve compression of video content and/or the formatting of video content for the display screen 115. In step 570 the video content may be recorded. As discussed above in more detail, in certain embodiments, recording may involve the digital recording of video content by a digital video recorder associated with the wireless phone 110 to a memory card, a hard drive, a flash memory device, etc.

In step 580 managing of the video content may occur. As discussed in more detail above, in certain embodiments a processor associated with the wireless phone 110, a software application running on the wireless phone's processor, and/or the like, may be used to manage recording of video content. In some embodiments of the present invention, management of the recording of video content may be separated into different aspects and performed by, for example, the storage controller 400, the content priority processor 420, etc. By way of example, the storage controller 400, the content priority processor 420 and/or other management processes may be performed by separate processors on the wireless phone 110, by software applications running on a processor managing content storage, by software applications running on a processor managing storage and reception of video content, and/or by software applications running on the wireless phone's processor. In some embodiments, management of recording may comprise evaluating storage space available for storing video content, evaluating quality of the received video content, evaluating desirability of the received video content, determining whether to record available video content based on parameters such as content quality, available storage space, ranking of the desirability of the video content, etc. In some embodiments of the present invention, management of the recording of video content may include providing alerts to the user regarding the status of video recording. In step 590 the recorded video content may be played-back on the wireless phone 110 by the player 175.

In the foregoing description, for the purposes of illustration, various methods and/or procedures were described in a particular order. It should be appreciated that in alternate embodiments, the methods and/or procedures may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods and/or procedures described above. In particular embodiments, for example, there may be a plurality of software components configured to execute on various hardware devices. Alternatively, the methods may be performed by a combination of hardware and software.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A system for managing mobile and on-demand digital recording of video content, comprising:
a wireless digital video recorder operable to receive and record video content;
a reception processor in communication with the wireless digital video recorder and configured to manage reception of the video content;
a global positioning system transceiver in communication with the reception processor and operable to determine a geographic position of the wireless digital video recorder, and
a storage processor in communication with the wireless digital video recorder,
wherein the wireless digital video recorder, the reception processor, the storage processor and the global positioning system transceiver are incorporated within a wireless phone, said wireless phone including a display and speakers;
wherein the reception processor is configured to simultaneously generate a visual alert on the display of the wireless phone and an audible alert through the speakers of the wireless phone to indicate at least one of start of video content recording, stop in video content recording, availability of new video content, and change in signal strength associated with the video content;
wherein the reception processor is further configured to use the geographic position of the wireless digital video recorder, as determined by the global positioning system transceiver, to identify availability of a broadcast video signal based on an available broadcast signal identified using the geographic position of the wireless digital video recorder, and to select the best receiving option to receive the video content from the at least one video content source, based on at least one of signal strength and signal characteristics, said signal characteristics including digital signal characteristics and analog signal characteristics;
wherein managing reception of the broadcast video content comprises identifying video content available to the wireless phone from at least one video content source;
wherein the storage processor associates a first priority value to a set of stored video content, wherein rating of the available video content and the stored video content is based upon preferences of a user of the wireless digital video recorder;
wherein the storage processor associates an expiration date with the set of video content stored on the wireless digital video recorder and erases the set of stored video content based upon the expiration date;
wherein the storage processor erases a set of stored video content from the wireless digital video recorder to provide storage space for newly available video content based upon the first priority value associated with the set of stored video content relative to a second priority value associated with the newly available video content; and wherein the storage processor provides an alert when video content selected for recording by the user exceeds storage space available to the wireless digital video recorder.

2. The system of claim 1, wherein the storage processor is configured to control the storage of the video content received by the wireless digital video recorder.

3. The system of claim 1, further comprising:
a receiver in communication with the reception processor and operable to receive transmitted information concerning the video content available to the wireless digital video recorder.

4. The system of claim 3, wherein the information is transmitted by a provider associated with the wireless digital video recorder.

5. The system of claim 3, wherein the information is transmitted by one of the at least one video content source.

6. The system of claim 3, wherein the reception processor is configured to display the information on the display screen.

7. The system of claim 1, further comprising:
a browser in communication with the reception processor, the browser being operable to browse the Internet, wherein the reception processor is operable to browse the Internet via the browser to identify availability of the video content.

8. The system of claim 1, wherein the reception processor is configured to identify a set of the video content available to the wireless digital video recorder.

9. The system of claim 8, wherein the reception processor is configured to select video content from the set of the video content for receiving by the wireless digital video recorder.

10. The system of claim 8, wherein the reception processor selects the video content based upon an analysis of reception rules; and wherein a user of the wireless digital video recorder provides the reception rules to the reception processor.

11. The system of claim 8, wherein the reception processor selects the video content based upon an analysis of previous video content received by the wireless digital video recorder.

12. The system of claim 1, wherein the reception processor is operable to use the geographic location of the wireless digital video recorder to identify an optimum provider of the broadcast video content.

13. A device for managing mobile and on-demand digital recording of video content for a wireless digital video recorder, comprising:
a wireless digital video recorder operable to receive and record video content;
a storage processor associated with the wireless digital video recorder and configured to manage the recording and storage of video content;
a reception processor in communication with the wireless digital video recorder and configured to manage the reception of the video content; and
a global positioning system transceiver in communication with the reception processor and operable to determine a geographic position of the wireless digital video recorder;
wherein the wireless digital video recorder, the storage processor, the global positioning system transceiver and the reception processor are incorporated within a wireless phone said wireless phone including a display and speakers;
wherein managing reception of the video content comprises identifying video content available to the wireless phone from at least one video content source;
wherein the reception processor is configured to simultaneously generate a visual alert on the display of the wireless phone and an audible alert through the speakers of the wireless phone to indicate at least one of start of video content recording, stop in video content recording, availability of new video content, and change in signal strength associated with the video content;
wherein the reception processor is further configured to use the geographic position of the wireless digital video recorder, as determined by the global positioning system transceiver, to identify availability of a broadcast video signal based on an available broadcast signal identified using the geographic position of the wireless digital video recorder, and to select the best receiving option to receive the video content from the at least one video content source, based on at least one of signal strength and signal characteristics, said signal characteristics including digital signal characteristics and analog signal characteristics;
wherein the storage processor associates a first priority value to a set of stored video content, wherein rating of the available video content and the stored video content is based upon preferences of a user of the wireless digital video recorder;
wherein the storage processor associates an expiration date with the set of video content stored on the wireless digital video recorder and erases the set of stored video content based upon the expiration date; and
wherein the storage processor erases a set of stored video content from the wireless digital video recorder to provide storage space for newly available video content based upon the first priority value associated with the set of stored video content relative to a second priority value associated with the newly available video content; and
wherein the storage processor provides an alert when video content selected for recording by the user exceeds storage space available to the wireless digital video recorder.

14. The device of claim 13, wherein the storage processor is configured to receive information concerning the video content received at the wireless digital video recorder.

15. The device of claim 14, wherein the storage processor receives the information from a reception processor associated with the wireless digital video recorder.

16. The device of claim 14, wherein the storage processor is configured to process whether to record the received video content.

17. The device of claim 16, wherein the storage processor makes a decision whether to record the received video content based upon an analysis of recording rules; and
wherein a user of the wireless digital video recorder provides the recording rules to the storage processor.

18. The device of claim 16, wherein the storage processor makes a decision whether to record the received video content based upon an analysis of a history of the video content recorded by the wireless digital video recorder.

19. The device of claim 13, wherein the storage processor determines the priority value based upon rules entered into the storage processor by a user of the wireless digital video recorder.

20. The device of claim 13, wherein the storage processor determines the priority value based upon a one of a prior recording history of the wireless digital video recorder, a prior reception history of the wireless digital video recorder, and a combination of the prior recording and reception history.

21. A method for managing mobile and on-demand digital recording of video content by a wireless digital video recorder, comprising:

identifying, by a reception processor incorporated within a wireless phone, a set of video content available to the wireless digital video recorder from at least one video content source, using the geographic position of the wireless digital video recorder, as determined by a global positioning system transceiver incorporated within the wireless phone;

associating, by a storage processor incorporated within the wireless phone, a first priority value to a set of stored video content;

recording, by the storage processor, selected video content from the set of stored video content on the wireless digital video recorder based upon a second priority value associated with the selected video content;

simultaneously generating, by the reception processor, a visual alert on the display of the wireless phone and an audible alert through the speakers of the wireless phone to indicate at least one of start of video content recording, stop in video content recording, availability of new video content, and change in signal strength associated with the video content; and selecting, by the reception processor, the best receiving option to receive the video content from the at least one video content source, based on at least one of signal strength and signal characteristics, said signal characteristics including digital signal characteristics and analog signal characteristics.

22. The method of claim 21, wherein identifying the set of available video content comprises receiving a list of available video content from a service provider associated with the wireless digital video recorder.

23. The method of claim 21, wherein identifying the set of available video content comprises receiving information concerning the available video content from a provider of the video content.

24. The method of claim 21, wherein identifying the set of available video content comprises determining the geographic position of the wireless digital video recorder relative to sources broadcasting video content, as determined by a global positioning system transceiver in the wireless digital video recorder.

25. The method of claim 21, wherein the second priority value associated with the selected video content is determined from preferences entered by a user into the wireless digital video recorder.

26. The method of claim 21, wherein the second priority value associated with the selected video content is determined from an analysis of prior recordings made by a user of the wireless digital video recorder.

27. The method of claim 21, wherein the second priority value associated with the selected video content is determined from a signal strength associated with the video content.

28. The method of claim 21, wherein rating of the available broadcast video content and the stored video content is based upon preferences of a user of the wireless digital video recorder.

\* \* \* \* \*